United States Patent
Chiba

(10) Patent No.: US 8,129,975 B2
(45) Date of Patent: Mar. 6, 2012

(54) SYNCHRONOUS RECTIFYING DC-DC CONVERTER

(75) Inventor: Hironori Chiba, Tokyo (JP)

(73) Assignee: TDK Corporation, Tokyo (JP)

( * ) Notice: Subject to any disclaimer, the term of this patent is extended or adjusted under 35 U.S.C. 154(b) by 653 days.

(21) Appl. No.: 12/320,696

(22) Filed: Feb. 2, 2009

(65) Prior Publication Data
US 2009/0237059 A1    Sep. 24, 2009

(30) Foreign Application Priority Data
Mar. 19, 2008  (JP) ................................. 2008-071036

(51) Int. Cl.
G05F 1/00    (2006.01)
(52) U.S. Cl. ........................................ 323/288; 323/283
(58) Field of Classification Search .................. 323/282, 323/283, 284, 288; 363/21.06, 21.14, 127
See application file for complete search history.

(56) References Cited

U.S. PATENT DOCUMENTS
7,292,018 B2 * 11/2007 Chen ............................. 323/282
2008/0007238 A1 *  1/2008 Ohtake ......................... 323/284

FOREIGN PATENT DOCUMENTS
| JP | A-63-240377 | 10/1988 |
| JP | A-63-287366 | 11/1988 |
| JP | A-2-164222 | 6/1990 |
| JP | A-2001-112241 | 4/2001 |
| JP | A-2007-68295 | 3/2007 |
| JP | A-2008-259283 | 10/2008 |

* cited by examiner

Primary Examiner — Harry Behm
Assistant Examiner — Matthew Grubb
(74) Attorney, Agent, or Firm — Oliff & Berridge, PLC

(57) ABSTRACT

There is provided a dead time control method capable of recognizing a critical situation in which a commutating transistor cannot be turned on because of a temporary variation in an output voltage of a synchronous rectifying DC-DC converter and adaptively preventing the commutating transistor from being turned on. The synchronous rectifying DC-DC converter compares an output Voff of an error amplifier with a voltage Vt obtained by multiplying the peak voltage of a ramp by G2. When Voff becomes greater than or equal to Vt, the converter determines that dead time is insufficient to control the switching of the commutating transistor and prevents the commutating transistor from being turned on.

6 Claims, 3 Drawing Sheets

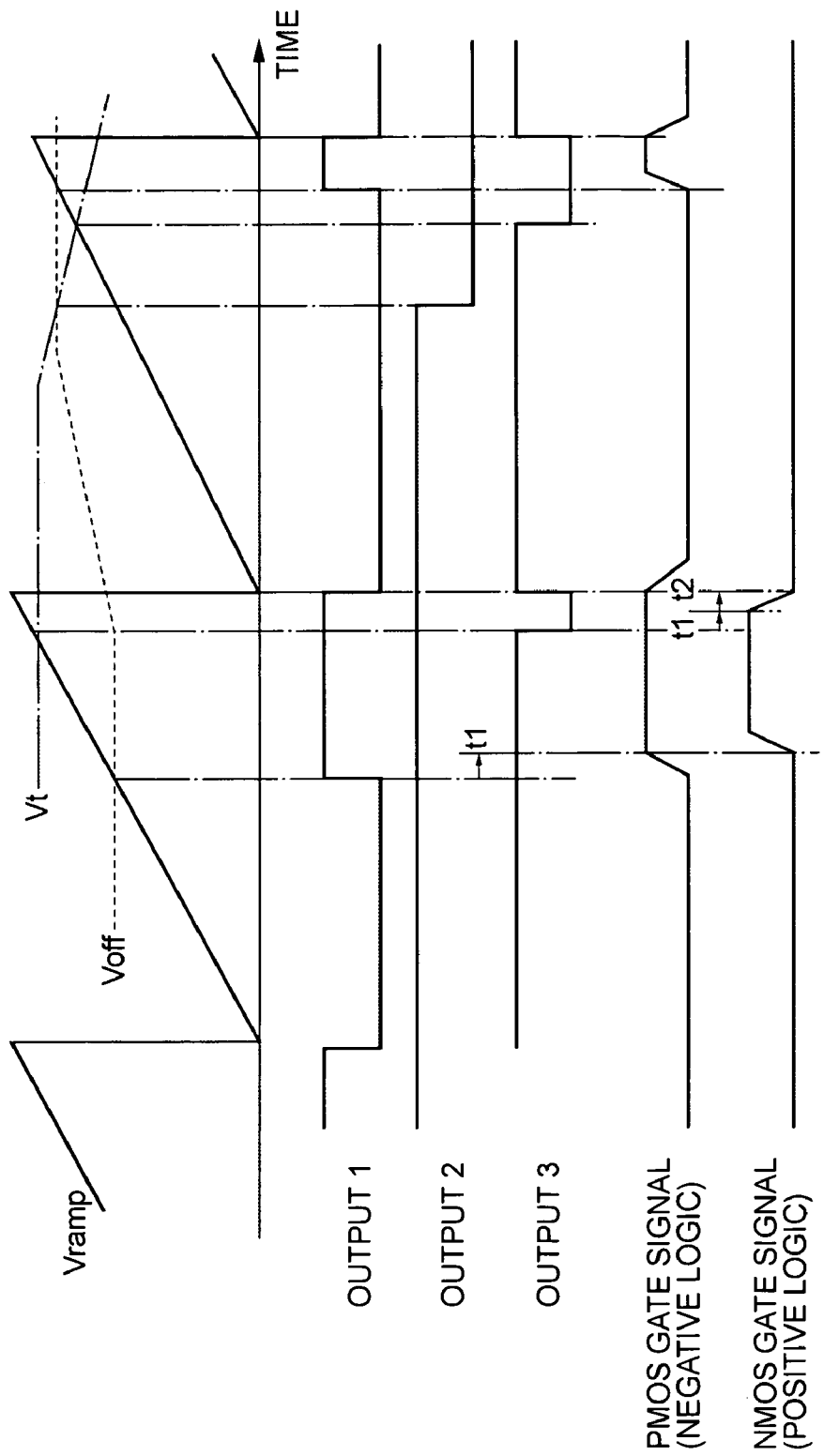

SYNCHRONOUS RECTIFYING DC-DC CONVERTER

BACKGROUND OF THE INVENTION

1. Field of the Invention

The present invention relates to a synchronous rectifying DC-DC converter and, in particular, to dead time control suitable for high-frequency switching.

2. Description of the Related Art

As portable devices become multifunctional, more and more power supply circuits with different operating voltages are incorporated into the portable devices. For example, a cellular phone includes power supplies such as those for a baseband IC, LCD driver, and power amplifier module with different operating voltages. As power supply circuits for converting a voltage supplied from a battery to an operating voltage of each power supply circuit, synchronous rectifying DC-DC converters have been known in which a switching transistor and a commutating transistor are connected in series between an input power supply and a ground and are turned on and off in a complementary manner to supply a DC voltage to a capacitor of a smoothing circuit connected in parallel with the commutating transistor. In the synchronous rectifying DC-DC converters, power efficiency is increased by controlling dead time so as to prevent a short-circuit current from flowing through the switching transistor and commutating transistor, as disclosed in Japanese Patent Laid-Open No. 2001-112241, for example. Examples of dead time control methods conventionally used include a method in which a certain delay time is inserted in a gate signal controlling the drive of the switching transistor and commutating transistor and alternatively a method in which an output voltage of an error amplifier is shifted to produce a dead time according to the amount of the shift.

The dead time control method described above is feasible when there is a sufficient time in a low-frequency range, and may improve power efficiency to some extent by optimization of dead time. However, a trend in DC-DC converter design for portable devices is that inductance and capacitor constants are reduced by increasing switching frequency, thereby reducing the size of the components. It is predicted that switching operation at 10 MHz or higher will be achieved in the near future. In such a high-frequency range, there will be little time available for dead time control.

In addition to the circumstances, there is another trend that variations in typical values of parameters (such as the DC resistance of an inductor, the on-resistance of a PMOS transistor, and the switching period of an oscillator) of the DC-DC converter are increasing. Therefore, there is a demand for development of a dead time control method capable of strictly controlling the drive of a commutating transistor with a high degree of accuracy by taking into consideration variations in parameters specific to individual products.

For example, if the lower limit of the input voltage of an internal battery (lithium ion battery) of a portable device is 2.8 V, the output voltage of the DC-DC converter is 1.8 V, the upper limit of output current is 1.2 A, the DC resistance of the inductor is 120 mΩ, the on-resistance of the MOS transistor is 350 mΩ, and the maximum error rate of switching frequency is 15%, then the allowable dead time is limited to 15 nsec or less. It is very difficult for the conventional dead time control methods, which rely on a static approach, to perform dead time control within such a severely limited time.

Therefore, an object of the present invention is to provide a dead time control method that identifies the allowable margin of dead time that is specific to a synchronous rectifying DC-DC converter, recognizes a critical situation in which a commutating transistor cannot be turned on for a reason such as a temporary variation in an output voltage of the synchronous rectifying DC-DC converter, and adaptively prevents the commutating transistor from being turned on in the critical situation.

SUMMARY OF THE INVENTION

To achieve the object, a synchronous rectifying DC-DC converter according to the present invention is a synchronous rectifying DC-DC converter increasing or decreasing an input voltage to an output voltage, including: a switching transistor being turned on and off at a duty cycle according to the ratio between the input voltage and the output voltage to stop and start the supply of the input voltage to convert the input voltage into a pulsed voltage; a commutating transistor being tuned off in synchronization with turning on of the switching transistor; a ramp generator outputting a ramp synchronizing to a switching period of the switching transistor; an error amplifier into which a feedback signal of the output voltage and a reference voltage for the output voltage are input; a holding circuit for temporarily holding a peak voltage of the ramp output from the ramp generator; a variable amplifier amplifying the peak voltage held in the holding circuit in accordance with a first value stored in a nonvolatile memory; a first comparator comparing the voltage of the ramp with an output voltage of the error amplifier and, when the voltage of the ramp is lower than the output voltage of the error amplifier, outputting a logic signal for turning on the switching transistor and, when the voltage of the ramp exceeds the output voltage of the error amplifier, outputting a logic signal for turning off the switching transistor; a second comparator comparing an output voltage of the variable amplifier with the output voltage of the error amplifier and, when the output voltage of the variable amplifier exceeds the output voltage of the error amplifier, outputting a logic signal for turning on the commutating transistor and, when the output voltage of the variable amplifier is lower than the output voltage of the error amplifier, outputting a logic signal for turning off the commutating transistor; a third comparator comparing the output voltage of the variable amplifier with the voltage of the ramp and, when the output voltage of the variable amplifier exceeds the voltage of the ramp, outputting a logic signal for turning on the commutating transistor and, when the output voltage of the variable amplifier is lower than the voltage of the ramp, outputting a logic signal for turning off the commutating transistor; a delay circuit inserting a delay time in a logic signal output from the first comparator; and an AND circuit performing an AND operation on logic signals output from the delay circuit, the second comparator, and the third comparator. Here, the switching transistor is turned on or off on the basis of a logic signal output from the first comparator, and the commutating transistor is turned on or off on the basis of a logic signal output from the AND circuit.

According to the configuration, the allowable margin of dead time specific to the synchronous rectifying DC-DC converter can be identified and, in a critical situation in which the commutating transistor cannot be turned on, the situation can be recognized and the commutating transistor can be adaptively prevented from being turned on.

Here, the first value is preferably equal to 1 minus the sum of the amount of gate charge and discharge time of the switching transistor and the amount of gate charge and discharge time of the commutating transistor divided by the sum of a typical value of the switching period and a period error of the ramp. This enables dead time control with variations in elements that are specific to the synchronous rectifying DC-DC converter being taken into consideration.

The delay time inserted by the delay circuit is preferably equal to or greater than the amount of gate charge and discharge time of the switching transistor. This enables the commutating transistor to be turned on after waiting for the switching transistor to surely turn off.

The ramp generator preferably corrects a switching period error by changing the gradient of the ramp on the basis of a second value stored in the nonvolatile memory. This is an effective means for reducing the convergence time immediately after power on or for achieving stable control.

The nonvolatile memory stores a peak voltage of the ramp measured when an input voltage exceeding an upper limit in normal operation is supplied. The first and second values described above can be calculated on the basis of the peak voltage of the ramp. For example, the second value is equal to the value of an input voltage exceeding the upper limit voltage in normal operation multiplied by a design peak value of the ramp divided by a design input voltage in normal operation multiplied by a peak voltage of the ramp measured when the input voltage exceeding the upper limit voltage in normal operation is supplied.

According to the present invention, the allowable margin of dead time that is specific to a synchronous rectifying DC-DC converter can be identified and, in a critical situation in which a commutating transistor cannot be turned on for a reason such as a temporary variation in output voltage of the synchronous rectifying DC-DC converter, the situation can be recognized and the commutating transistor can be adaptively prevented from being turned on.

BRIEF DESCRIPTION OF THE DRAWINGS

FIG. 4 is a timing chart illustrating operation of the synchronous rectifying DC-DC converter according to the present embodiment.

DETAILED DESCRIPTION OF THE PREFERRED EMBODIMENT

Figure 1:
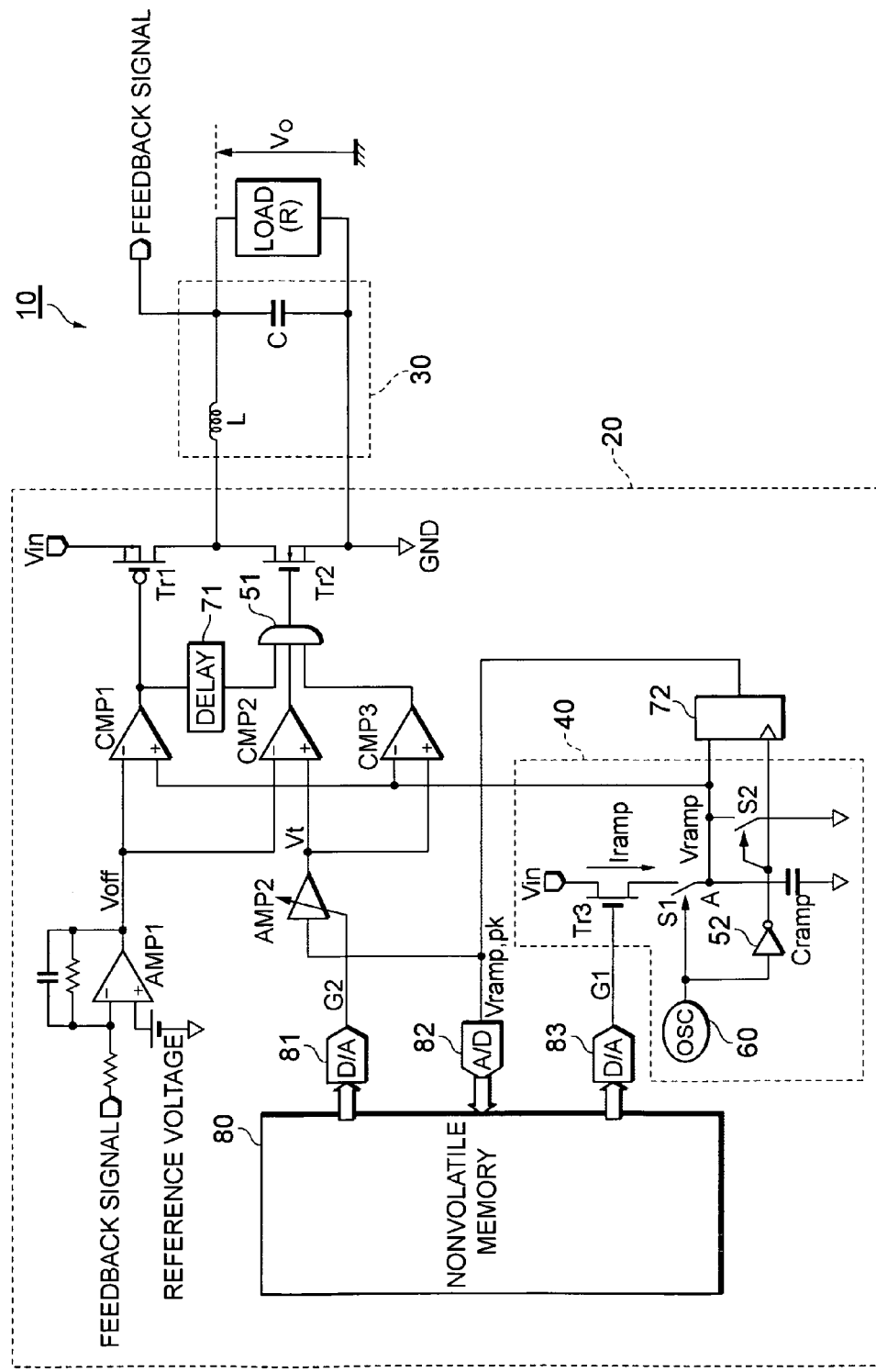
FIG. 1 is a circuit diagram of a synchronous rectifying DC-DC converter according to an embodiment of the present invention.

An embodiment of the present invention will be described with reference to the accompanying drawings.

A synchronous rectifying DC-DC converter 10 according to an embodiment of the present invention is a step-down converter for decreasing an input voltage Vin supplied from a source such as a battery to a desired output voltage Vo to supply the operating voltage Vo to a load R. The synchronous rectifying DC-DC converter 10 includes a power-supply control circuit 20 which outputs a pulsed voltage that is duty-cycle-controlled in accordance with the ratio between the input voltage Vin and the output voltage Vo and a smoothing circuit 30 which smoothes the pulsed voltage to supply the DC voltage Vo to the load R. The power-supply control circuit 20 includes a switching transistor Tr1, a commutating transistor Tr2, a ramp generator 40, an error amplifier AMP1, a variable amplifier AMP2, comparators CMP1, CMP2, and CMP3, an AND circuit 51, a logic inverter 52, a delay circuit 71, a latch circuit (holding circuit) 72, a nonvolatile memory 80, an A-D converter 82, and D-A converters 81 and 83. The switching transistor Tr1 and the commutating transistor Tr2 are connected in series between an input power-supply voltage Vin and a ground GND. The smoothing circuit 30 is a low-pass filter including an inductor L and a capacitor C connected in series between the connection point of the switching transistor Tr1 and the commutating transistor Tr2 and the ground GND.

The switching transistor Tr1 is turned on and off at a duty cycle according to the ratio between the input voltage Vin and the output voltage Vo, thereby stopping and starting the supply of the DC voltage Vin to convert the DC voltage Vin into a pulsed voltage. The pulsed voltage is smoothed at the smoothing circuit 30 into the DC voltage Vo and supplied to the load R. Switching of the switching transistor Tr1 and the commutating transistor Tr2 is controlled in such a way that they are turned on and off in a complementary manner. For example, when the switching transistor Tr1 is turned on, the commutating transistor Tr2 is turned off, thereby storing energy in the inductor L. On the other hand, when the switching transistor Tr1 is turned off, the commutating transistor Tr2 is turned on, thereby forming a current path for supplying the energy stored in the inductor L to the load R.

While an example is given in which a PMOS transistor is used as the switching transistor Tr1 and an NMOS transistor is used as the commutating transistor Tr2 for simplicity of the circuit configuration, the present invention is not limited to the example. Both transistors Tr1 and Tr2 can be implemented by NMOS transistors by adding a bootstrap circuit. Depending on applications, amplifiers such as bipolar transistors and IGBT (insulated gate bipolar transistor) may be used.

Figure 2:
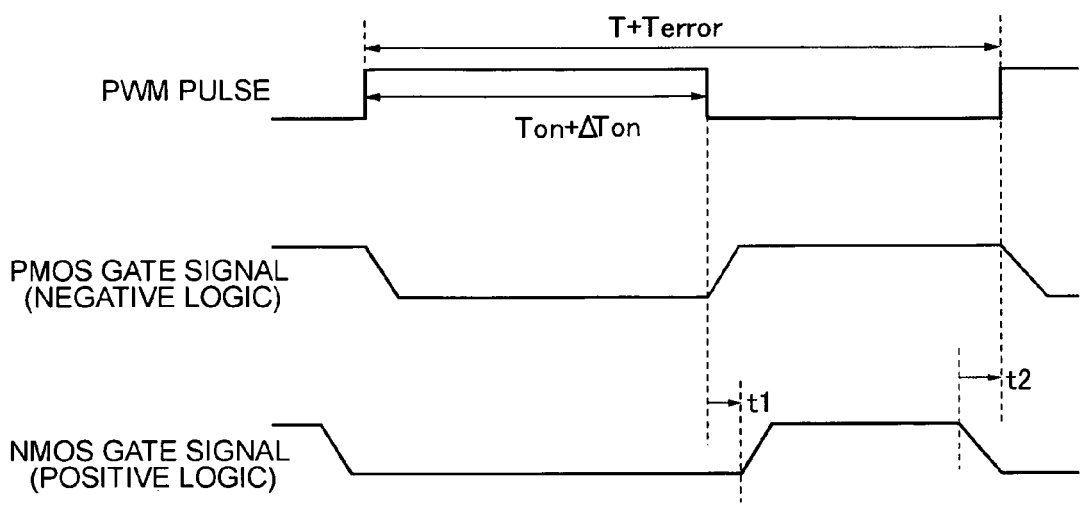
FIG. 2 is a timing chart showing the relationship between a PWM pulse and dead time.

Before detailing components of the power-supply control circuit 20, the relationship between a PWM (pulse Width Modulation) pulse for controlling drive of the switching transistor Tr1 and the dead time of the commutating transistor Tr2 with reference to FIG. 2. In FIG. 2, "T" denotes a typical value of a switching period, "Terror" denotes a switching period error, "Ton" denotes the center value of an on-period of the switching transistor Tr1, "ΔTon" denotes the length of time for adjusting the on-period by PWM control, "t1" denotes a gate charge/discharge time of the switching transistor Tr1, and "t2" denotes a gate charge/discharge time of the commutating transistor Tr2. The PMOS gate signal represents a logic signal (negative logic) input in the gate terminal of the PMOS transistor (switching transistor Tr1) and the NMOS gate signal represents a logic signal (positive logic) input in the gate terminal of the NMOS transistor (commutating transistor Tr2). As can be seen from FIG. 2, there is a certain delay time t1 in rising and falling of the switching transistor Tr1 and a certain delay time t2 in rising and falling of the commutating transistor Tr2. The minimum length of dead time required for dead time control in one switching period is (t1+t2). Here, the following equations hold for the duty and the allowable margin Tmargin for the dead time (t1+t2) in each switching period.

$$(Ton+\Delta Ton)/(T+Terror)=F(Io, Vo)/Vin \quad (1)$$

$$F(Io, Vo)=(Ron+Rdc)\times(Io+\Delta Io)+(Vo-\Delta Vo) \quad (2)$$

$$Tmargin \leq (T+Terror)-(Ton+\Delta Ton)-(t1+t2) \quad (3)$$

Here, "F (Io, Vo)" is a function of Io and Vo, "Ron" is the on-resistance of the switching transistor Tr1, "Rdc" is the DC resistance of the inductor L, "Io" is the average value of output current supplied to the load R, "ΔIo" is an increase or decrease in the output current due to a load variation, "Vo" is the typical value of the output voltage supplied to the load R, and "ΔVo" is an increase or decrease in the output voltage due to a load variation.

Returning to FIG. 1, a configuration of the ramp generator 40 will be described. The ramp generator 40 includes a transistor Tr3, a capacitor Cramp, an oscillator 60, switches S1 and S2, and a logic inverter 52. The oscillator 60 is an oscillation circuit oscillating at an oscillation period T. The oscillation period T defines the switching period T of the switching transistor Tr1. The transistor Tr3 operates in a linear region and controls the gain of a charging current Iramp flowing through the charging path of the capacitor Cramp. A logic signal supplied from the oscillator 60 to the switch S1 is inverted by the logic inverter 52 and is provided to the switch S2. Accordingly, the switches S1 and S2 are turned on and off in a complementary manner at the oscillation period T. The switch S1 is turned on at the start of the switching period T and remains on until right before the end of the switching period T while the switch S2 is turned off at the start of the switching period T and remains off until right before the end of the switching period T. In this period, a constant charging current Iramp flows from the input voltage Vin into the capacitor Cramp through the transistor Tr3. The capacitor Cramp is charged with a ramp voltage Vramp and the potential of a node A connected to one end of the capacitor Cramp linearly rises from 0 V. Then, during a short period of time from the end of the switching period T until right before the start of the next switching period T, the switch S1 is turned off and the switch S2 is turned on. At this moment, the charge in the capacitor Cramp is instantly discharged and the potential at the node A instantaneously decreases to 0 V. By periodically controlling the switching of the switches S1 and S2 in this way, a ramp (triangular wave) Vramp synchronizing to the switching period T is output from the node A.

Figure 3:
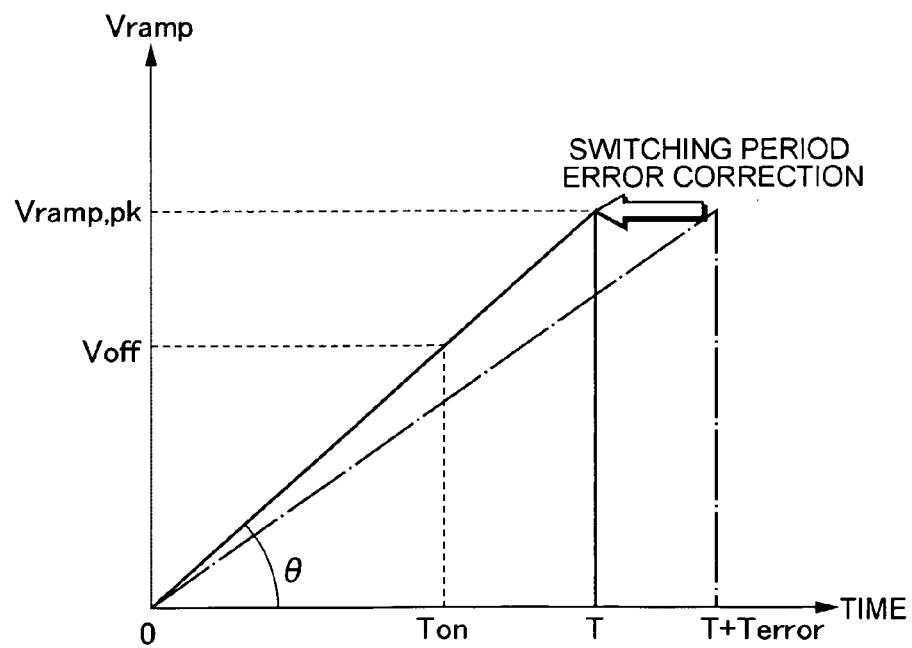
FIG. 3 is a diagram illustrating switching period error correction.

A method for correcting a switching period error Terror will now be described with reference to FIG. 3. The switching period error Terror is caused by a variation in an element constant of the oscillator 60 and is an error specific to the oscillator 60. The following equations hold for the switching period error Terror.

$$V\text{ramp}, pk = I\text{ramp} \times (T + T\text{error})/C\text{ramp} \quad (4)$$

$$\tan \theta = V\text{ramp}, pk/(T + T\text{error}) \quad (5)$$

$$\tan \theta = (G1 \times V\text{in})/C\text{ramp} \quad (6)$$

Here, "Vramp, pk" represents the peak voltage value of the ramp voltage "Vramp" with which the capacitor "Cramp" is charged, "θ" represents the gradient (time change rate) of the ramp voltage "Vramp", and "G1" represents the conductance of the transistor Tr3. As can be seen from FIG. 3, by controlling the gate potential of the transistor Tr3 to change the conductance of the transistor Tr3, the gradient θ of the ramp voltage "Vramp" can be adjusted to reduce the switching period error "Terror" to virtually zero. The peak ramp voltage "Vramp, pk" of the ramp is not necessarily constant but can change with variations in power supply of the input voltage Vin. The latch circuit 72 temporarily holds the peak voltage "Vramp, pk" of the ramp of each switching period and updates the ramp peak voltage value temporarily held in it to the peak voltage of the ramp of the next switching period.

How to calculate "G1" will be described below. The following relationship holds between "G1" and the peak voltage "Vramp, pk".

$$G1 = (T + T\text{error})/T \quad (7)$$

$$G1 = (V\text{in, test} \times V\text{ramp}, dv)/(V\text{in}, dv \times V\text{ramp}, pk) \quad (8)$$

Here, "Vin, test" represents a test voltage of the input power supply Vin during testing, "Vin, dv" represents the nominal voltage of the input power supply Vin in the circuit design (or in the specifications of the circuit), and "Vramp, dv" represents the nominal peak voltage of the ramp Vramp in the circuit design. It should be noted that "Vramp, pk" in Equation (8) is the peak voltage of the ramp in the previous switching period that is temporarily held in the latch circuit 72. "Vin, test" is a test bias voltage that is exploratively input in the DC-DC converter 10 in order to calculate "G1" described above and "G2", which will be described later. For example, "Vin, test" is preferably a voltage exceeding the upper limit by a certain value or more in the specifications of the DC-DC converter 10 and within the recommended operating power-supply voltage range of the transistor. The test bias voltage may be input in the DC-DC converter 10 in a stage before shipping of the product, for example.

The test peak voltage "Vramp, pk" is converted into digital data by the A-D converter 82 and the digital data is stored in the nonvolatile memory 80. The test peak voltage "Vramp, pk" stored as the digital data in the nonvolatile memory 80 is used by well-known reading means such as an external tester and is used in calculation of "G1". "G1" calculated according to Equation (6) is converted to the gate potential of the transistor Tr3 and is stored in the nonvolatile memory 80 as digital data. In operation of the DC-DC converter 10, the D-A converter 83 supplies a gate potential corresponding to "G1" stored in the nonvolatile memory 80 to the gate terminal of the transistor Tr3. Upon the supply of the gate potential, the gradient of the ramp Vramp is corrected so that the switching period error "Terror" becomes zero. The switching period error correction is not necessarily required for performing dead time control but is effective for reducing convergence time immediately after power on or for achieving stable control.

Returning to FIG. 1, operation of the error amplifier AMP1 and comparators CMP1, CMP2, and CMP3 will be described, with reference to FIG. 4 as needed. The error amplifier AMP1 has an integral transfer characteristic. A feedback signal of the output voltage Vo is provided to the inverting input terminal of the error amplifier AMP1 while a reference voltage (nominal output voltage) for the output voltage Vo is provided to the noninverting input terminal of the error amplifier AMP1. An output voltage Voff of the error amplifier AMP1 is provided to the inverting input terminal of the comparator CMP1 while a ramp Vramp output from the ramp generator 40 after frequency error correction is provided to the noninverting input terminal of the comparator CMP1. As shown in the timing chart of FIG. 4, the comparator CMP1 compares the voltage value of the ramp Vramp with Voff. When the voltage value of the ramp Vramp is lower than Voff, the comparator CMP1 outputs a low-level logic signal for turning on the switching transistor Tr1. When the voltage value of the ramp Vramp increases to a value greater than or equal to Voff, the comparator CMP1 outputs a high-level logic signal for turning off the switching transistor Tr1. The signal output from the comparator CMP1 is the PWM pulse shown in FIG. 2. As can be seen from FIG. 4, the value of Voff is not necessarily constant but can change to converge the difference between the feedback signal and the reference voltage which varies depending on the power consumption of the load R. The delay circuit 71 inserts a delay time in the PWM pulse output from the comparator CMP1. The delay time is equal to or greater than the gate charge/discharge time t1 of the switching transistor Tr1. For simplicity, the delay time inserted by the delay circuit 71 is equal to the gate charge/discharge time t1 of the switching transistor Tr1 in the timing chart shown in FIG. 4.

The output voltage Voff of the error amplifier AMP1 is provided to the inverting input terminal of the comparator CMP2 while a voltage Vt is provided to the noninverting input terminal. As shown in FIG. 4, the voltage Vt is the voltage value of the ramp Vramp at the time point a length of time equal to the dead time (t1+t2) before the end of a switching period. When Voff becomes equal to Vt, the right-hand side of Equation (3) becomes equal to zero. When Voff exceeds Vt, the right-hand side of Equation (3) decreases to a negative value and therefore the dead time is insufficient to control the switching of the commutating transistor Tr2. The comparator CMP2 compares Voff with Vt. When Voff is lower than Vt (that is, when the dead time is sufficient to control the switching of the commutating transistor Tr2), the comparator CMP2 outputs a high-level logic signal for turning on the commutating transistor Tr2. When Voff becomes greater than or equal to Vt (that is, the dead time is insufficient to control the switching of the commutating transistor Tr2), the comparator CMP2 outputs a low-level logic signal for turning off the commutating transistor Tr2.

The ramp Vramp output from the ramp generator 40 after frequency error correction is provided to the inverting input terminal of the comparator CMP3 whiles the voltage Vt described above is provided to the noninverting input terminal. The comparator CMP3 compares the voltage value of the ramp Vramp with Vt. When the voltage value of the ramp Vramp is lower than Vt, the comparator CMP3 outputs a high-level logic signal for turning on the commutating transistor Tr2. When the voltage value of the ramp Vramp becomes higher than or equal to Vt, the comparator CMP3 outputs a low-level logic signal in order to turn off the commutating transistor Tr2 at the time point a length of time equal to the dead time (t1+t2) before the start of the next switching period.

The AND circuit 51 provides a logic signal obtained by ANDing output signals of the delay circuit 71 and the comparators CMP2 and CMP3 to the gate terminal of the commutating transistor Tr2 to control the switching of the commutating transistor Tr2.

A method for generating the voltage Vt will now be described. The following relationship holds between the voltage Vt and the peak voltage "Vramp, pk".

$$Vt = G2 \times Vramp, pk \quad (9)$$

$$G2 = \{(T+Terror)-(t1+t2)\}/(T+Terror) \quad (10)$$

It should be noted that "Vramp, pk" in Equation (9) is the peak voltage of the ramp in the previous switching period that is temporarily held in the latch circuit 72. The value of "G2" is calculated according to Equation (10) and is stored in the nonvolatile memory 80 in a stage before shipping of the product, for example. The value of "G2" is read from the nonvolatile memory 80 during operation of the synchronous rectifying DC-DC converter 10, and is then converted by the D-A converter 81 into analog data, and the analog data is provided to the variable amplifier AMP2. The variable amplifier AMP2 attenuates the peak voltage "Vramp, pk" on the basis of the value of "G2" to output the voltage Vt as shown in Equation (9).

While the commutating transistor Tr2 is prevented from being turned on in a switching period in which Voff becomes greater than or equal to Vt in the timing chart shown in FIG. 4, the energy accumulated in the inductor L while the switching transistor Tr1 is on flows to the load R through a parasitic diode formed in the commutating transistor Tr2. It should be noted that the timing chart was prepared for illustrating a switching period in which dead time control of the commutating transistor Tr2 is possible and a switching period in which dead time control of the commutating transistor Tr2 is impossible, and that the voltage values Voff and Vt can vary in a different way from that shown in FIG. 4 depending on various factors such as a variation of the power consumption of the load R, an increase in resistance component due to a temperature rise and an input voltage drop during use of the battery. While the step-down DC-DC converter has been shown in the present embodiment by way of example, the principle of the dead time control according to the present embodiment is applicable to a step-up DC-DC converter as well.

What is claimed is:
1. A synchronous rectifying DC-DC converter increasing or decreasing an input voltage to an output voltage, comprising:
  a switching transistor being turned on and off at a duty cycle according to a ratio between the input voltage and the output voltage to stop and start a supply of the input voltage to convert the input voltage into a pulsed voltage;
  a commutating transistor being tuned off in synchronization with turning on of the switching transistor;
  a ramp generator outputting a ramp synchronizing to a switching period of the switching transistor;
  an error amplifier into which a feedback signal of the output voltage and a reference voltage for the output voltage are input;
  a holding circuit for temporarily holding a peak voltage of the ramp output from the ramp generator;
  a variable amplifier amplifying the peak voltage held in the holding circuit in accordance with a first value stored in a nonvolatile memory;
  a first comparator comparing the voltage of the ramp with an output voltage of the error amplifier and, when the voltage of the ramp is lower than the output voltage of the error amplifier, outputting a logic signal for turning on the switching transistor and, when the voltage of the ramp exceeds the output voltage of the error amplifier, outputting a logic signal for turning off the switching transistor;
  a second comparator comparing an output voltage of the variable amplifier with the output voltage of the error amplifier and, when the output voltage of the variable amplifier exceeds the output voltage of the error amplifier, outputting a logic signal for turning on the commutating transistor and, when the output voltage of the variable amplifier is lower than the output voltage of the error amplifier, outputting a logic signal for turning off the commutating transistor;
  a third comparator comparing the output voltage of the variable amplifier with the voltage of the ramp and, when the output voltage of the variable amplifier exceeds the voltage of the ramp, outputting a logic signal for turning on the commutating transistor and, when the output voltage of the variable amplifier is lower than the voltage of the ramp, outputting a logic signal for turning off the commutating transistor;
  a delay circuit inserting a delay time in a logic signal output from the first comparator; and
  an AND circuit performing an AND operation on logic signals output from the delay circuit, the second comparator, and the third comparator;

wherein the switching transistor is turned on or off on the basis of a logic signal output from the first comparator, and the commutating transistor is turned on or off on the basis of a logic signal output from the AND circuit.

2. The synchronous rectifying DC-DC converter according to claim 1, wherein the first value is equal to 1 minus the sum of the amount of gate charge and discharge time of the switching transistor and the amount of gate charge and discharge time of the commutating transistor divided by the sum of a typical value of the switching period and a period error of the ramp.

3. The synchronous rectifying DC-DC converter according to claim 1, wherein the delay time is equal to or greater than the amount of gate charge and discharge time of the switching transistor.

4. The synchronous rectifying DC-DC converter according to claim 1, wherein the ramp generator corrects a switching period error by changing the gradient of the ramp on the basis of a second value stored in the nonvolatile memory.

5. The synchronous rectifying DC-DC converter according to claim 1, wherein the nonvolatile memory stores a peak voltage of the ramp measured when an input voltage exceeding an upper limit in normal operation is supplied.

6. The synchronous rectifying DC-DC converter according to claim 4, wherein the second value is equal to the value of an input voltage exceeding the upper limit voltage in normal operation multiplied by a design peak value of the ramp divided by a design input voltage in normal operation multiplied by a peak voltage of the ramp measured when the input voltage exceeding the upper limit voltage in normal operation is supplied.

* * * * *